(12) United States Patent
Abe et al.

(10) Patent No.: US 8,432,480 B2
(45) Date of Patent: Apr. 30, 2013

(54) INTERCHANGEABLE LENS, CAMERA BODY AND CAMERA SYSTEM

(75) Inventors: Takashi Abe, Ehime (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/438,100

(22) Filed: Apr. 3, 2012

(65) Prior Publication Data

US 2012/0212635 A1 Aug. 23, 2012

Related U.S. Application Data

(63) Continuation of application No. 12/466,070, filed on May 14, 2009, now Pat. No. 8,169,535.

(60) Provisional application No. 60/053,815, filed on May 16, 2008.

(30) Foreign Application Priority Data

Jun. 3, 2008 (JP) .................................. 2008-145689

(51) Int. Cl.
*H04N 5/235* (2006.01)
*H04N 5/76* (2006.01)

(52) U.S. Cl.
USPC .................. 348/363; 348/231.1; 348/362

(58) Field of Classification Search ............ 348/363, 348/362, 231.1, 360; 359/676, 257
See application file for complete search history.

(56) References Cited

U.S. PATENT DOCUMENTS 7,236,193 B2   6/2007  Suemoto et al. ........... 348/231.8
8,120,674 B2 *  2/2012  Koike et al. ............... 348/231.8

FOREIGN PATENT DOCUMENTS

| JP | 2000-287122 A | 10/2000 |
| JP | 2005-010367 A | 1/2005 |
| JP | 2006-215310 A | 8/2006 |

* cited by examiner

*Primary Examiner* — Hung Dang
(74) *Attorney, Agent, or Firm* — Panasonic Patent Center

(57) ABSTRACT

A camera body to which an interchangeable lens is mountable includes a receiving unit operable to receive speed information, a first controller unit operable to select a shooting mode from a moving image shooting mode and a still image shooting mode, a second controller unit capable of setting whether to operate in a silent mode provided for a situation where a drive sound of a drive unit in the interchangeable lens is desired to be at a low level during the moving image shooting mode, a third controller unit operable to generate a control signal for changing light amount which is changed by a diaphragm in the interchangeable lens, at a constant speed based on the speed information, when the moving image shooting mode is selected and the silent mode is not set, and a body transmitting unit operable to transmit the generated control signal to the interchangeable lens.

6 Claims, 4 Drawing Sheets

*Fig. 2A*   W-END

| AV VALUE | 3.0~4.0 | 4.0~5.0 | 5.0~7.0 | 7.0~9.0 |
|---|---|---|---|---|
| SPEED (MAX) (AV/S) | 17 | 67 | 100 | 133 |
| SPEED (MIN) (AV/S) | 2 | 8 | 12 | 17 |
| SPEED (SILENT) (AV/S) | 4 | 17 | 25 | 33 |

*Fig. 2B*   N-POSITION

| AV VALUE | 3.5~4.5 | 4.5~5.5 | 5.5~7.5 | 7.5~9.0 |
|---|---|---|---|---|
| SPEED (MAX) (AV/S) | 17 | 67 | 100 | 133 |
| SPEED (MIN) (AV/S) | 2 | 8 | 12 | 17 |
| SPEED (SILENT) (AV/S) | 4 | 17 | 25 | 33 |

*Fig. 2C*   T-END

| AV VALUE | 4.0~5.0 | 5.0~6.0 | 6.0~8.0 | 8.0~9.0 |
|---|---|---|---|---|
| SPEED (MAX) (AV/S) | 17 | 67 | 100 | 133 |
| SPEED (MIN) (AV/S) | 2 | 8 | 12 | 17 |
| SPEED (SILENT) (AV/S) | 4 | 17 | 25 | 33 |

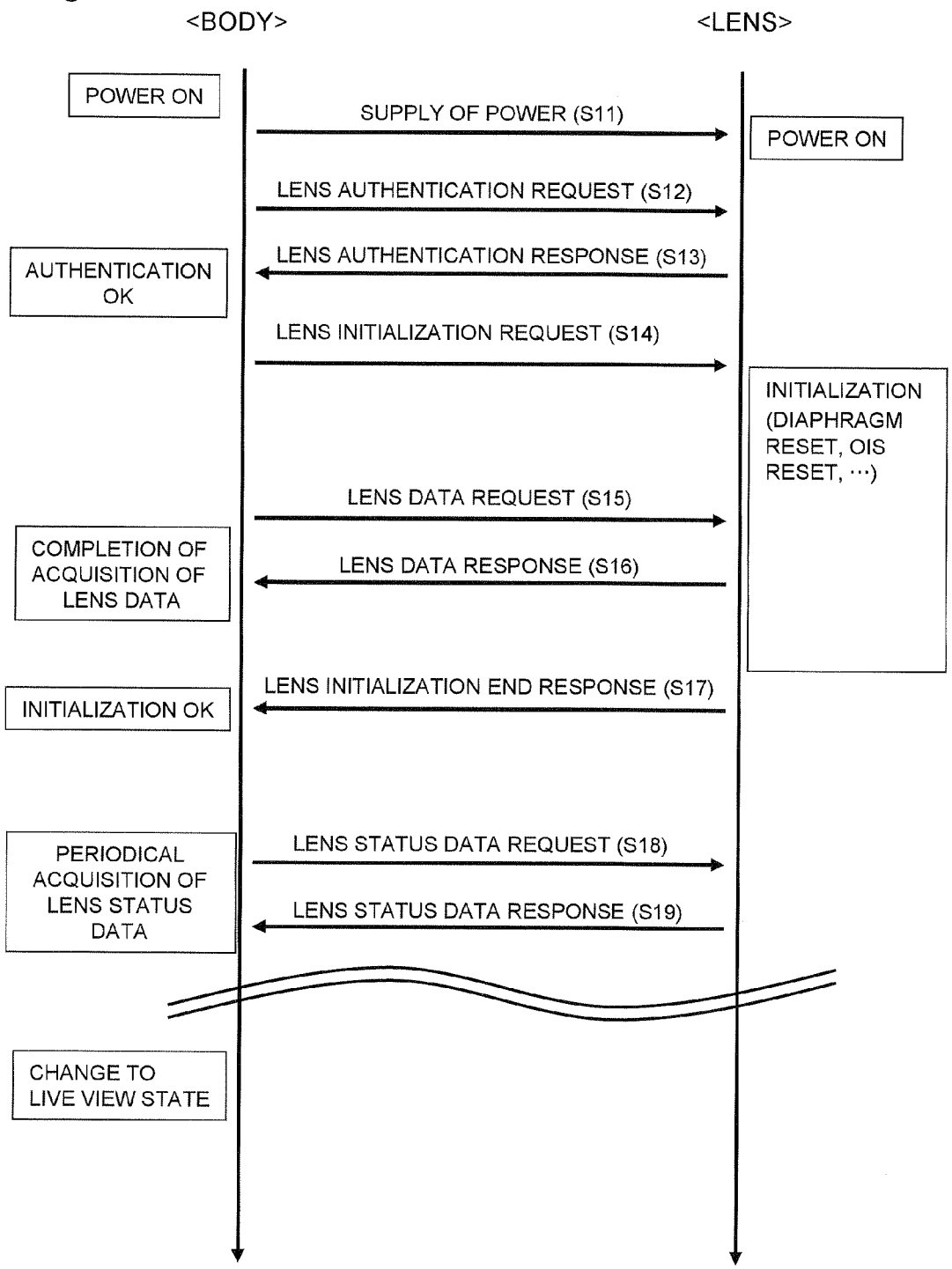

INTERCHANGEABLE LENS, CAMERA BODY AND CAMERA SYSTEM

This application is a continuation of U.S. patent application Ser. No. 12/466,070, filed on May 14, 2009, now U.S. Pat. No. 8,169,535, which claims the benefit of U.S. Provisional Application No. 61/053,815 filed May 16, 2008, the entire contents of which are hereby incorporated by reference herein.

BACKGROUND

1. Technical Field

The technical field relates to an interchangeable lens, a camera body, and a camera system provided with the interchangeable lens and the camera body.

2. Related Art

JP-A-2006-215310 has disclosed an interchangeable lens system that is provided with a video camera, an interchangeable lens for a single-lens reflex camera that is attachable to the video camera and an exchange adapter used for connecting these. The interchangeable lens for a single-lens reflex camera is designed so as to shoot a still image. Therefore, in general, upon receipt of diaphragm-driving control from the video camera, the interchangeable lens controls the diaphragm so as to be driven at the highest speed. However, in a case where the diaphragm is always driven at the highest speed, upon shooting a moving image by the video camera, it fails to carry out a smooth diaphragm operation in response to a variation in light amount due to a change in the subject, resulting in a failure to execute a smooth AE control operation. Therefore, the interchangeable lens system of JP-A-2006-215310 places the exchange adapter between the video camera and the interchangeable lens for a single-lens reflex camera, and by using the exchange adapter, an optimal driving speed for the diaphragm of the interchangeable lens is calculated, and the diaphragm is thus controlled so that a smooth diaphragm operation is carried out, and it becomes possible to execute an AE control operation smoothly.

As described above, since the conventional interchangeable lens for a single-lens reflex camera is designed so as to shoot a still image, it is not suitable in general for use in shooting a moving image. For this reason, in a case where the interchangeable lens for a single-lens reflex camera is used for shooting a moving image, the exchange adapter needs to be attached thereto, as in the case of JP-A-2006-215310. However, in the exchange adapter of JP-A-2006-215310, a driving speed to be used upon driving the diaphragm is not set by taking into consideration an aperture value. Consequently, when the aperture value is abruptly changed upon shooting a moving image, it fails to realize a natural change in light amount, resulting in a problem of unnatural image quality. Consequently, it is not possible to realize a smooth change in brightness in an image in accordance with a diaphragm control operation, failing to obtain superior image quality upon shooting a moving image.

To solve the above-mentioned problems, an object is to provide an interchangeable lens and a camera body that are capable of providing superior image quality even when shooting a moving image, and a camera system provided with such interchangeable lens and camera body. More specifically, it achieves an interchangeable lens and a camera body that can achieve a smooth variation in brightness in an image in accordance with a diaphragm control operation, and a camera system provided with such interchangeable lens and camera body.

SUMMARY

In a first aspect, an interchangeable lens mountable to a camera body is provided. The interchangeable lens includes an optical system operable to collect light from a subject to form a subject image, a diaphragm operable to adjust an amount of light of the subject image to be collected by the optical system, a driving unit operable to drive the diaphragm based upon an aperture value within a predetermined range, a storage unit operable to store speed information relating to a speed at which the driving unit can be set to drive the diaphragm, and a transmitting unit operable to transmit the speed information stored in the storage unit to the camera body. The speed information is provided for each of a plurality of aperture value ranges which are obtained by dividing the predetermined range of the aperture value, and relates to the speed indicating a settable rate of change in the light amount which changes as the driving unit drives the diaphragm.

In a second aspect, a camera body to which an interchangeable lens is mountable is provided. The interchangeable lens includes a driving unit operable to drive a diaphragm based upon an aperture value within a predetermined range, and a storage unit operable to store speed information relating to a speed at which the driving unit can be set to drive the diaphragm. The speed information is provided for each of a plurality of aperture value ranges which are obtained by dividing the predetermined range of the aperture value, and relates to the speed indicating a settable rate of change in a light amount which changes as the driving unit drives the diaphragm. The camera body includes a receiving unit operable to receive the speed information from the interchangeable lens, a generation unit operable to generate a control signal for driving the driving unit based upon the speed information received by the receiving unit, and a transmitting unit operable to transmit the generated control signal to the interchangeable lens.

The present camera system according to the other aspect is provided with the above-mentioned interchangeable lens and the above-mentioned camera body.

The above configurations can provide an interchangeable lens and a camera body that are capable of providing superior image quality when shooting a moving image, and a camera system provided with such interchangeable lens and camera body.

BRIEF DESCRIPTION OF THE DRAWINGS

FIG. 2A is a view that shows a driving speed of a diaphragm for each of predetermined AV value ranges in a case where a zoom lens is located at a wide-angle end; FIG. 2B is a view that shows a driving speed of the diaphragm for each of predetermined AV value ranges in a case where the zoom lens is located at the middle position between the wide-angle end and a telephoto end; and FIG. 2C is a view that shows a driving speed of the diaphragm for each of predetermined AV value ranges in a case where the zoom lens is located at the telephoto end.

FIG. 3 is a flowchart that shows an initializing operation of the camera system in accordance with the embodiment.

DETAILED DESCRIPTION OF THE PREFERRED EMBODIMENTS

1. Embodiments

Referring to attached Figures, the following description will discuss embodiments.

1-1. Configuration

1-1-1. Overview

Figure 1:
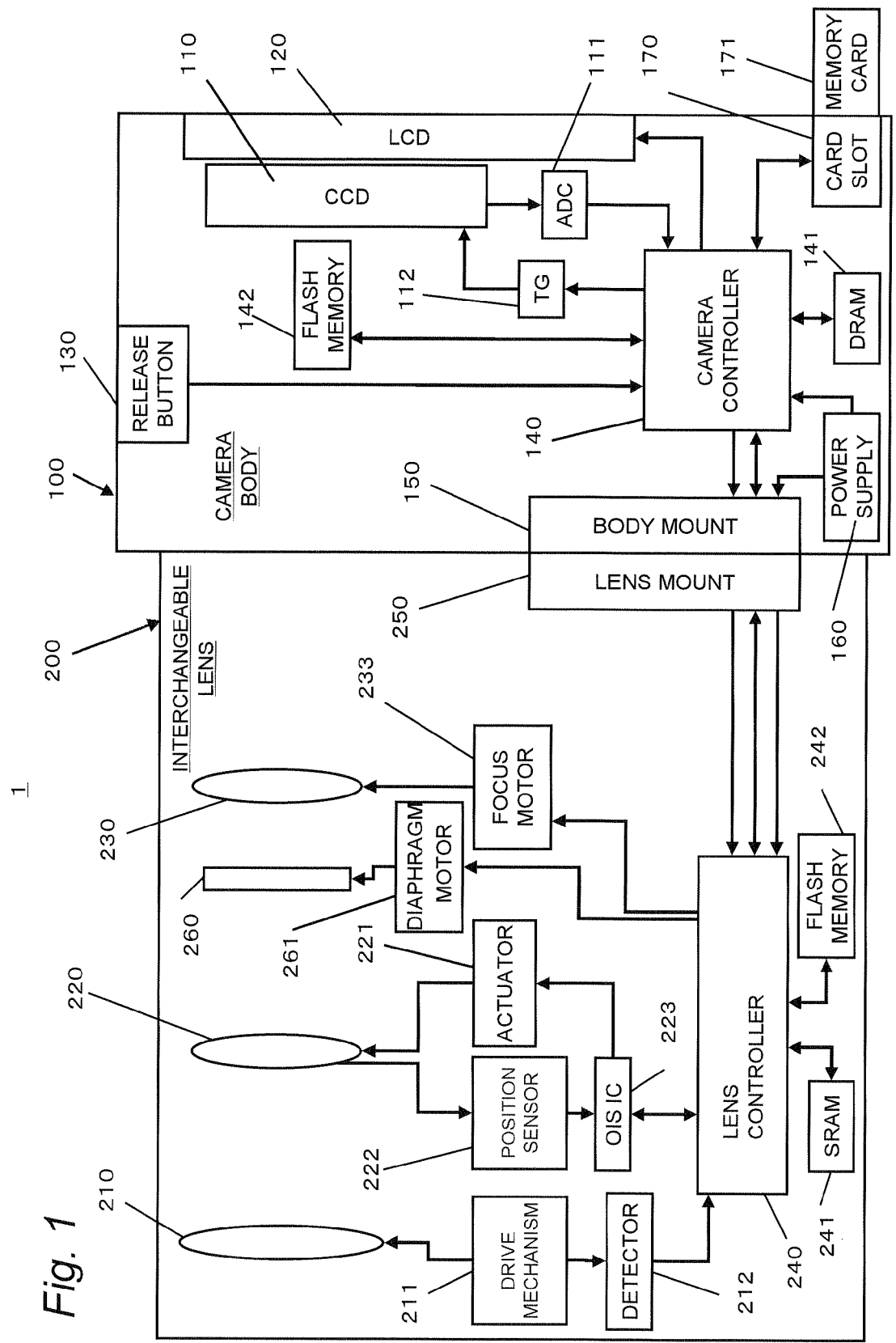
FIG. 1 is a block diagram that shows a structure of a camera system in accordance with one embodiment.

FIG. 1 is a block diagram showing a configuration of a camera system according to an embodiment. A camera system 1 of the embodiment is a digital single-lens camera with an interchangeable lens. The camera system 1 includes a camera body 100 and an interchangeable lens 200 mountable to the camera body 100. The camera system 1 enables that the change of the brightness due to diaphragm control is smoothed by storing speed information according to an aperture value in the interchangeable lens 200.

1-1-2. Configuration of Camera Body

The camera body 100 includes a CCD image sensor 110, a liquid crystal monitor 120, a camera controller 140, a body mount 150, a power supply 160, a card slot 170, and a flash memory 142.

The camera controller 140 controls the entire operation of the camera system 1 by controlling components such as the CCD image sensor 110 in response to an instruction from operation members such as a release button 130. The camera controller 140 transmits a vertical synchronizing signal to a timing generator (TG) 112. In parallel with this, the camera controller 140 generates an exposure synchronizing (sync) signal based on the vertical synchronizing signal. The camera controller 140 periodically transmits the generated exposure synchronizing signal to a lens controller 240 through the body mount 150 and a lens mount 250. The camera controller 140 uses a DRAM 141 as a work memory when performing a control operation or image processing operation. The camera controller 140 stores, in the flash memory 142, speed information when driving the diaphragm 260 obtained from the interchangeable lens 200 (described in detail later with FIG. 2).

The CCD image sensor 110 captures a subject image that enters through the interchangeable lens 200 to generate image data. Specifically, the CCD image sensor 110 is exposed at predetermined timing to capture a subject image and generate image data. The generated image data is digitized by an AD converter (ADC) 111. The digitized image data by the AD converter 111 is subjected to predetermined image processing by the camera controller 140. The predetermined image processing includes, for example, a gamma correction process, a white balance correction process, a flaw correction process, a YC conversion process, an electronic zoom process, and a JPEG compression process.

The CCD image sensor 110 operates at timing that is controlled by the timing generator 112. The operations of the CCD image sensor 110 include a still-image capturing operation, a moving-image capturing operation, a through-the-lens image (hereinafter, referred to as a "through image") capturing operation, and the like. The through image is an image not recorded in the memory card 171 after capturing the image. The through image is mainly a moving image and is displayed on the liquid crystal monitor 120 so that a user can determine composition for capturing a still image.

The liquid crystal monitor 120 displays an image represented by display image data that is subjected to image processing by the camera controller 140. The liquid crystal monitor 120 can selectively display both a moving image and a still image.

The card slot 170 allows the memory card 171 to be attached thereto, and controls the memory card 171 under control of the camera controller 140. The memory card 171 can store image data generated by image processing by the camera controller 140. The memory card 171 can store, for example, JPEG image files. Image data or an image file stored in the memory card 171 can be read. The image data or image file read from the memory card 171 is subjected to image processing by the camera controller 140. For example, the camera controller 140 decompresses image data or an image file obtained from the memory card 171 to generate display image data.

The power supply 160 supplies power to be consumed by the camera system 1. The power supply 160 may be, for example, a dry battery or rechargeable battery. Alternatively, the power supply 160 may supply power to the camera system 1 from an external source through a power cable.

The body mount 150 can be mechanically and electrically connected to the lens mount 250 of the interchangeable lens 200. The body mount 150 can transmit and receive data with the interchangeable lens 200 through the lens mount 250. The body mount 150 transmits an exposure synchronizing signal received from the camera controller 140 to the lens controller 240 through the lens mount 250. Also, the body mount 150 transmits other control signals received from the camera controller 140, to the lens controller 240 through the lens mount 250. Also, the body mount 150 transmits a signal received from the lens controller 240 through the lens mount 250 to the camera controller 140. Also, the body mount 150 supplies power received from the power supply 160 to the entire interchangeable lens 200 through the lens mount 250.

1-1-3. Configuration of Interchangeable Lens

The interchangeable lens 200 includes an optical system, a diaphragm 260, a diaphragm motor 261, the lens controller 240, the lens mount 250, and an flash memory 242. The optical system of the interchangeable lens 200 includes a zoom lens 210, an OIS lens 220, and a focus lens 230.

The zoom lens 210 is a lens for changing the magnification of a subject image to be formed by the optical system. The zoom lens 210 includes one or a plurality of lenses. A driver 211 includes a zoom ring or the like that can be operated by a user, and transmits an operation of the user to the zoom lens 210 to cause the zoom lens 210 to move along an optical axis direction of the optical system. A detector 212 detects moving amount of the driver 211. The lens controller 240 can grasp a zoom magnification of the optical system by receiving a result of the detection by the detector 212.

The OIS lens 220 is a lens for correcting blur of a subject image to be formed by the optical system of the interchangeable lens 200. The OIS lens 220 moves in a direction to compensate for the blur of the camera system 1, thereby reducing blur of a subject image on the CCD image sensor 110. The OIS lens 220 includes one or a plurality of lenses. An actuator 221 drives the OIS lens 220 in a plane vertical to an optical axis of the optical system, under the control of an OIS IC 223. The actuator 221 can be implemented by, for example, a magnet and a planar coil. A position sensor 222 is a sensor for detecting a position of the OIS lens 220 in the plane vertical to the optical axis of the optical system. The position sensor 222 can be implemented by, for example, a magnet and a Hall element. The OIS IC 223 controls the actuator 221 based on a detection result obtained by the position sensor 222 and a detection result obtained by a camera shake detector such as a gyro sensor. The OIS IC 223 obtains a detection result by the camera shake detector from the lens controller 240.

Also, the OIS IC 223 transmits a signal indicating a status of an optical image shake correction process to the lens controller 240.

The diaphragm 260 is a member for adjusting the amount of light passing through the optical system. The diaphragm 260 is, for example, configured by a plurality of diaphragm blades, and adjusts the amount of light which passes through the optical system, that is, which is collected on the CCD image sensor 110 by changing an opening size of an aperture formed by blades. The diaphragm motor 261 is a driver for controlling the opening size of the aperture formed by the diaphragm 260.

The focus lens 230 is a lens for changing a focus status of a subject image to be formed on the CCD image sensor 110 through the optical system. The focus lens 230 includes one or a plurality of lenses.

A focus motor 233 drives the focus lens 230 to move back and forth along the optical axis of the optical system under control of the lens controller 240. By this, the focus status of a subject image to be formed on the CCD image sensor 110 through the optical system can be changed. In the present embodiment, as the focus motor 233, a stepping motor can be used. Note, however, that the present embodiment is not limited thereto and the focus motor 233 can also be implemented by a DC motor, an ultrasonic motor, and the like.

The lens controller 240 controls the entire interchangeable lens 200 by controlling the OIS IC 223, the focus motor 233, and the like, based on control signals from the camera controller 140. For example, the lens controller 240 controls the focus motor 233 so that the focus lens 230 moves back and forth along the optical axis by the determined drive method based on the control signal from the camera controller 140. Also, the lens controller 240 receives signals from the detector 212, the OIS IC 223, and the like, and transmits the signals to the camera controller 140. Transmission and reception of data between the lens controller 240 and the camera controller 140 is performed through the lens mount 250 and the body mount 150. The lens controller 240 uses a SRAM 241 as a work memory when performing control.

The flash memory 242 stores programs and parameters to be used for the control by the lens control 240. For example, the flash memory 242 stores speed information relating to a rate of change in an amount of light which passes through the optical system, that is, which is collected on the CCD image sensor 110, as shown in FIGS. 2A-2C. The light amount changes as the diaphragm 260 is driven.

FIGS. 2A-2C shows information (speed information) relating to a settable rate of change in the light amount which is changed as the diaphragm motor 261 drives the diaphragm 260. Specifically, FIG. 2A shows information on a settable rate of change in the light amount in a case where the zoom lens 210 is located at a wide-angle end (W-end). FIG. 2B shows information on a settable rate of change in the light amount of in a case where the zoom lens 210 is located at the middle position (N-position) between the wide-angle end and a telephoto end. FIG. 2C is shows information on a settable rate of change in the light amount in a case where the zoom lens 210 is located at the telephoto end (T-end).

The maximum value (highest speed) of a rate of change in the light amount, the minimum value (lowest speed) of a rate of change in the light amount and the silent speed takes different values depending on the AV value (Aperture Value). Therefore, in the present embodiment, as shown by FIGS. 2A, 2B and 2C, a range of a possible aperture value is divided into a plurality of ranges (aperture value ranges), and highest speed, lowest speed and silent speed settable as a rate of change in the light amount are set in each of the aperture value ranges. Here, the "range of a possible aperture value" is, for example, set to "3.0 to 9.0" in FIG. 2A, set to "3.5 to 9.0" in FIG. 2B, and set to "4.0 to 9.0" in FIG. 2C. Moreover, for example, in FIG. 2A, the "aperture value ranges" are respectively set to "3.0 to 4.0", "4.0 to 5.0", "5.0 to 7.0" and "7.0 to 9.0". Furthermore, the "silent speed" is a rate of change in the light amount when the diaphragm 260 is driven at a driving speed that makes the driving sound generated upon driving the diaphragm 260 comparatively small. More specifically, the "silent speed" corresponds to a rate of change in the light amount when silent operation is performed, that is, the diaphragm motor 261 drives the diaphragm 260 under a noise level that is the same noise level as, or smaller than the smaller noise level of two noise levels derived from driving sounds generated when the diaphragm 260 is driven by the diaphragm motor 261 at the highest speed and when the diaphragm 260 is driven at the lowest speed. Hereinafter, "highest speed of the diaphragm 260" means a highest rate of change in the light amount which changes as the diaphragm 260 is driven, "lowest speed of the diaphragm 260" means a lowest rate of change in the light amount which changes as the diaphragm 260 is driven, and "silent speed of the diaphragm 260" means a rate of change in the light amount which changes as the diaphragm 260 is driven by the silent operation.

In the interchangeable lens 200, when the AV value (aperture value) of the diaphragm 260 is located within a predetermined range of aperture values, the highest speed, the lowest speed and the silent speed are set to be the same values respectively. For example, in a case where, as shown in FIG. 2A, the zoom lens 210 is located at the wide-angle end with the AV value of the diaphragm 260 being set within 3.0 to 4.0, the lowest speed of the diaphragm 260 is set to 2 (AV/S), the highest speed thereof is set to 17 (AV/S) and the silent speed is set to 4 (AV/S). Moreover, in a case where, as shown in FIG. 2B, the zoom lens 210 is located in the middle position between the wide-angle end and the telephoto end with the AV value of the diaphragm 260 being set within 3.5 to 4.5, the lowest speed of the diaphragm 260 is set to 2 (AV/S), the highest speed thereof is set to 17 (AWS) and the silent speed is set to 4 (AV/S).

The F value of the interchangeable lens 200 varies depending on the positions of the zoom lens 210, even when the aperture diameter of the diaphragm 260 is the same. For this reason, as shown in FIGS. 2A to 2C, in a camera system 1 of the present embodiment, the AV value range (aperture value range) in which the diaphragm 260 can be driven at a constant speed is made different depending on the positions of the zoom lens 210. For example, when the zoom lens 210 is located at the wide-angle end, as shown in FIG. 2A, the AV value range (aperture value range) in which the diaphragm 260 can be driven at a constant speed is divided into "3.0 to 4.0", "4.0 to 5.0", "5.0 to 7.0" and "7.0 to 9.0", and when the zoom lens 210 is located in the middle position between the wide-angle end and the telephoto end, the AV value range (aperture value range) in which the diaphragm 260 can be driven at a constant speed is divided into "3.5 to 4.5", "4.5 to 5.5", "5.5 to 7.5" and "7.5 to 9.0".

As described above, the interchangeable lens 200 of the camera system 1 of the present embodiment holds speed information relating to the highest speed, lowest speed and silent speed among the rates of change in the light amount which changes upon driving the diaphragm 260, for each of predetermined aperture value ranges. Thus, the interchangeable lens 200 makes it possible to inform the camera body 100 of the speed information of the diaphragm 260, prior to driving the diaphragm 260. For this reason, the camera body 100 can confirm the driving speed of the diaphragm 260 of the interchangeable lens 200, and can drive the diaphragm 260 at a driving speed set by taking the aperture value into consideration. For example, in FIG. 2A, even when the aperture value is changed from "3.0" to "9.0", the diaphragm 260 can be driven at a constant speed of 17 (AV/S).

1-1-4. Corresponding Relationship

The camera body 100 is one example of a camera body of the present embodiment. The interchangeable lens 200 is one example of an interchangeable lens of the present embodiment. At least one of the zoom lens 210, OIS lens 220 and focusing lens 230 forms an optical system of the present embodiment. The diaphragm 260 is one example of a diaphragm of the present embodiment. The diaphragm motor 261 is one example of a driving unit of the present embodiment. The flash memory 242 is one example of a storage unit of the present embodiment. The body mount 150 is one example of a receiving unit of the present embodiment. The camera controller 140 is one example of a generation unit of the present embodiment. The body mount 150 is one example of a transmitting unit of the present embodiment. The lens mount 250 is one example of a lens-side transmitting unit (first transmitting unit) of the present embodiment. The body mount 150 is one example of a body-side transmitting unit (second transmitting unit) of the present embodiment.

1-2. Operation 1-2-1. Initial Operation

First, referring to FIG. 3, the following description will discuss operations for preparing an image-shooting process in the camera system 1. FIG. 3 is a view that shows signal transmitting and receiving states of the image-shooting preparing operations in the camera system 1.

When a user turns on power to the camera body 100 with the interchangeable lens 200 mounted on the camera body 100, the power supply 160 supplies power to the interchangeable lens 200 through the body mount 150 and the lens mount 250 (S11). Then, the camera controller 140 requests the lens controller 240 for authentication information of the interchangeable lens 200 (S12). The authentication information of the interchangeable lens 200 includes information on whether the interchangeable lens 200 is mounted and information on whether accessories are mounted. The lens controller 240 responds to the lens authentication request from the camera controller 140 (S13).

Then, the camera controller 140 requests the lens controller 240 to perform an initialization operation (S14). In response to this, the lens controller 240 performs an initialization operation, such as reset of a diaphragm 260 and reset of the OIS lens 220.

Then, the camera controller 140 requests the lens controller 240 to send lens data in parallel the initialization operation (S15). The lens data is stored in the flash memory 242.

The lens controller 240 reads the lens data from the flash memory 242 and sends the lens data back to the camera controller 140 (S16). The lens data includes characteristic values specific to the interchangeable lens 200, such as a lens name, F-number, a focal length, and speed information shown in FIG. 2.

The lens controller 240 then sends, to the camera controller 140, a response indicating that the lens initialization operation has been completed when the initialization operation of the interchangeable lens 200 has been completed (S17).

When the camera controller 140 grasps the lens data of the interchangeable lens 200 mounted on the camera body 100, the camera system 1 goes into a status capable of capturing. In this status, the camera controller 140 periodically requests the lens controller 240 for lens status data indicating a status of the interchangeable lens 200 (S18). The lens status data includes, for example, information of position of the zoom lens 210, information of position of the focus lens 230, and information of aperture value. In response to the request, the lens controller 240 sends back the requested lens status data to the camera controller 140 (S19).

In this status, the camera system 1 moves into a state of displaying an image represented by image data generated by the CCD image sensor 110 on the liquid crystal monitor 120 as a through image. This state is called "live view state". In the live view state, a through image of a moving image is displayed on the liquid crystal monitor 120 so that the user can determine composition for capturing an image while viewing the liquid crystal monitor 120.

1-2-2. Diaphragm Control

Figure 4:
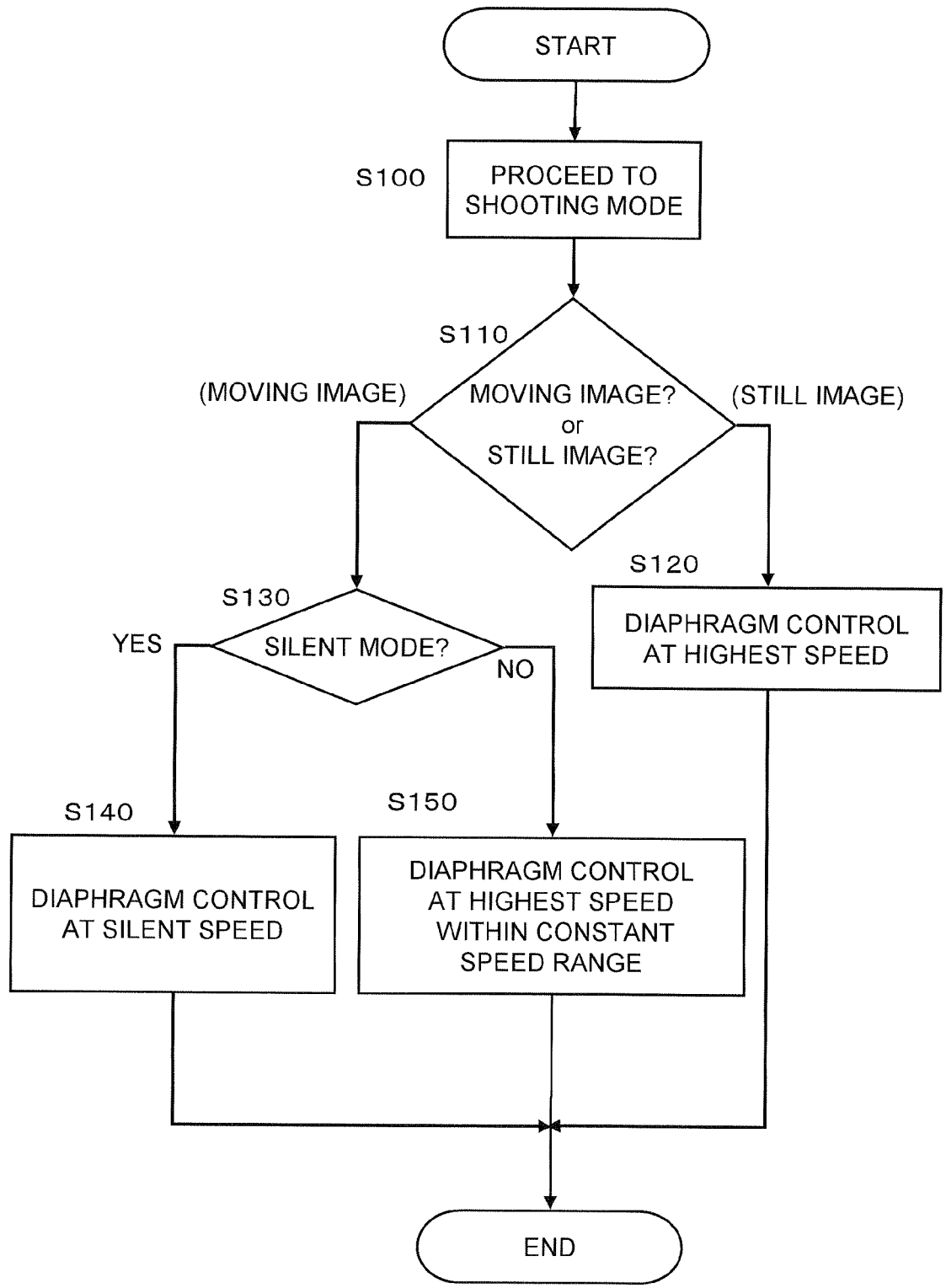
FIG. 4 is a flowchart that shows image-shooting operations of the camera system in accordance with the embodiment.

With reference to FIG. 4, the diaphragm control is explained as one example of the operation of the camera system 1 which has completed the image shooting preparation. FIG. 4 is a flowchart showing the operation of the camera controller 140 which controls the diaphragm.

Upon completion of the image-shooting preparation, the camera system 1 proceeds to an image-shooting mode (S100). In the image-shooting mode, the camera controller 140 first determines whether the current image-shooting mode is a still image shooting mode or a moving image shooting mode (S110).

Upon determining that the image-shooting mode is the still image shooting mode, the camera controller 140 controls the interchangeable lens 200 so that, upon driving the diaphragm 260, the diaphragm 260 is driven at the highest speed (S120). This is because, in the case of the still image shooting mode, since the diaphragm 260 is basically in the open state in the image-shooting preparation stage, it is not necessary to keep the speed constant as long as a high-speed shift to a desired aperture value can be made at the moment of an image-shooting process. Here, in the initializing stage, the camera body 100 has acquired speed information indicating the driving speed of the diaphragm 260 for each of aperture value ranges from the interchangeable lens 200 as lens data. Therefore, the camera controller 140 can drive the diaphragm 260 at the highest speed within each of the aperture value ranges. For example, as shown in FIG. 2A, in the case where the zoom lens 210 is located at the wide-angle end with the AV value (aperture value) being set to "4.5", the diaphragm 260 is driven at (AV/S). Here, the camera controller 140 acquires information relating to the lens position and aperture value from the interchangeable lens 200 in synchronized timing with a vertical synchronous signal.

Here, upon determining that the image-shooting mode is a moving image shooting mode, the camera controller 140 determines whether or not the moving image shooting mode is a silent mode that is an operation mode for suppressing noise sound of the diaphragm motor 261 to a low level, of moving image shooting modes in the camera system 1 (S130). Here, for example, by installing an exclusively-used button for specifying the silent mode on the camera body 100, the silent mode is set by the user operating the exclusively-used button.

Upon determining that the current mode is the silent mode, the camera controller 140 controls the interchangeable lens 200 so that the diaphragm 260 is driven at the silent speed (S140). For example, in the case where the zoom lens 210 is located at the wide-angle end as shown in FIG. 2A with the AV value being set to "4.5", the diaphragm 260 is driven at 17 (AV/S).

In contrast, upon determining that the current mode is not the silent mode, the camera controller 140 controls the interchangeable lens 200 so that the diaphragm 260 is driven at the highest speed among the velocities that can be used as a constant driving speed (S150). For example, in the case where the zoom lens 210 is located at the wide-angle end as shown in FIG. 2A, since the highest speed among velocities that can be used as a constant driving speed in all the ranges of AV values of "3.0 to 4.0", "4.0 to 5.0", "5.0 to 7.0" and "7.0 to 9.0" is 17 (AV/S), the diaphragm 260 is driven at 17 (AV/S).

As described above, in the camera body 100 in the present embodiment, upon turning the power supply on, speed information indicating the driving speed of the diaphragm 260 for each of predetermined aperture value ranges is acquired from the interchangeable lens 200, and upon driving the diaphragm 260, the acquired speed information is used. Therefore, the camera body 100 of the present embodiment can control the driving operation of the diaphragm 260 of the interchangeable lens 200 at an optimal driving speed set by taking the aperture value into consideration. Consequently, it is possible to make smoother variations in brightness of an image caused by the diaphragm control. With this arrangement, it becomes possible to obtain good image quality upon shooting a moving image. Moreover, by acquiring the speed information for each interchangeable lens, the camera body 100 can control the diaphragm driving operation at a speed that is determined to be desirable in accordance with the characteristic of each interchangeable lens.

Moreover, in a case where, upon shooting a moving image, the current mode is not set to the silent mode, the camera system 1 of the present embodiment drives the diaphragm 260 at the highest speed among velocities that can be used as a constant driving speed. Therefore, upon shooting a moving image by using a mode other than the silent mode, it is possible to shoot the moving image at a speed as high as possible with a constant speed in light amount variation.

1-3. Summary of the Present Embodiment

The interchangeable lens 200 of the present embodiment, which is detachably attached to the camera main body 100, is provided with optical systems 210, 220 and 230 that collect light from an subject to form an subject image, a diaphragm 260 that adjusts the light amount of the subject image collected by the optical systems, a diaphragm motor 261 that drives the diaphragm based upon an aperture value within a predetermined range and a flash memory 242 that stores speed information that includes speed information relating to a speed settable as a rate of change in the light amount which is changed as the diaphragm motor 261 drives the diaphragm 260, and which are set for each of a plurality of aperture value ranges which are ranges made by dividing a predetermined range of aperture values and when the power supply of the camera body 100 is turned on with the interchangeable lens 200 being attached to the camera body 100, the speed information is transmitted from the interchangeable lens 200 to the camera body 100. Therefore, upon shooting a moving image, the camera body 100 can control the driving operation of the diaphragm 260 of the interchangeable lens 200 at an optimal driving speed set by taking the aperture value into consideration. Thus, it becomes possible to make smoother variations in brightness of an image due to the diaphragm control. Thus, it becomes possible to obtain good image quality upon shooting a moving image.

Moreover, the camera system 1 of the present embodiment is provided with a body mount 150 that acquires speed information from the flash memory 242, a camera controller 140 that generates a control signal used for driving the diaphragm motor 261 based upon the information acquired by the body mount 150 and a body mount 150 that transmits the generated control signal to the interchangeable lens 260. Consequently, by acquiring speed information for each interchangeable lens, the camera body 100 of the present embodiment can control the diaphragm driving speed at a speed that is determined to be desirable in accordance with the characteristic of each interchangeable lens.

2. Other Embodiments

In the above-mentioned embodiment, there is used an optical system in which, although the aperture diameter of the diaphragm is the same, the F value is varied depending on positions of the zoom lens 210. However, not limited to this structure, there may be used an optical system in which, although the position of the zoom lens is different, the F value is not varied if the aperture diameter of the diaphragm is the same.

Moreover, in the aforementioned embodiment, there is used an arrangement in which, prior to completion of the initialization of the lens, the camera body 100 requests the interchangeable lens 200 to send lens data. However, the present embodiment is not intended to be limited by this structure. There may be used another arrangement in which, after completion of the initialization of the lens, the camera body 100 requests the interchangeable lens 200 to send lens data.

Moreover, in the aforementioned embodiment, the interchangeable lens 200 is designed to store the highest speed, the lowest speed and the silent speed to be used upon driving the diaphragm 260. However, the present embodiment is not limited to this structure. The interchangeable lens 200 may store at least one piece of information indicating the maximum and minimum values of a speed settable as a driving speed at which the diaphragm motor 261 can drive the diaphragm 260, in each of plurality of aperture value ranges. The plurality of aperture value ranges are obtained by dividing a predetermined range of aperture value which the diaphragm 260 can take. For example, the interchangeable lens 200 may be designed to store only the maximum speed, or only the minimum speed, for each of the predetermined aperture value ranges.

Furthermore, in the aforementioned embodiment, the interchangeable lens 200 is provided with the flash memory 242; however, the present embodiment is not limited to this structure. In place of the flash memory 242, a non-writable ROM may be installed therein.

In the aforementioned embodiment, a structure having a zoom lens 210 and an OIS lens 220 has been exemplified; however, these are not indispensable components for the present embodiment. That is, the present embodiment may be applicable to a camera system to which a single focal lens is attached, and the present embodiment may also be applicable to a camera system with an interchangeable lens attached thereto, which has no camera shake correction function.

Moreover, in the aforementioned embodiment, the camera body 100 is not provided with a movable mirror; however, the present embodiment is not intended to be limited by this structure. For example, a movable mirror may be installed in the camera body 100, or a prism to be used for splitting a subject image may be installed therein. Moreover, the movable mirror may be installed not in the camera body 100, but in the adapter.

In the aforementioned embodiment, the CCD image sensor 110 is used as an image-shooting element; however, the present embodiment is not intended to be limited by this. For example, a CMOS image sensor may be used as the imaging device, or a NMOS image sensor may be used as the imaging device.

The aforementioned embodiment has exemplified a digital still camera as the camera system 1; however, the application of the present embodiment is not limited to the digital still camera. The present embodiment may be applicable to any camera, as long as it is a lens exchangeable camera, and may be applied to a digital video camera.

INDUSTRIAL APPLICABILITY

The present embodiment has such an effect that it is possible to make smoother variations in brightness of an image due to the diaphragm control, and can be effectively used for an interchangeable lens that is detachably attached to a camera body, a camera body to which an interchangeable lens is detachably attached and a camera system provided with such interchangeable lens and camera body.

Although the present embodiment has been described in connection with specified embodiments thereof, many other modifications, corrections and applications are apparent to those skilled in the art. Therefore, the present embodiment is not limited by the disclosure provided herein but limited only to the scope of the appended claims. The present disclosure relates to subject matter contained in US. Patent Application No. 61/053,815 filed on May 16, 2008 and Japanese Patent Application No. 2008-145689, filed on Jun. 3, 2008, which is expressly incorporated herein by reference in its entirety.

What is claimed is:

1. A camera body to which an interchangeable lens is mountable, the interchangeable lens including:
an optical system operable to collect light from a subject to form a subject image;
a driving unit operable to drive a diaphragm for adjusting an amount of light of the subject image to be collected by the optical system; and
a lens transmitting unit operable to transmit, to the camera body, speed information relating to a settable speed of change in the light amount which is changed by the diaphragm driven by the driving unit;

the camera body comprising:
a receiving unit operable to receive the speed information;
a first controller unit operable to select a shooting mode from a moving image shooting mode for shooting a moving image and a still image shooting mode for shooting a still image;
a second controller unit capable of setting whether or not to operate in a silent mode which is provided for a situation where a drive sound of the drive unit is desired to be at a low level during the moving image shooting mode;
a third controller unit operable to generate a control signal for changing the light amount which is changed by the driven diaphragm, at a constant speed based on the speed information, when the moving image shooting mode is selected by the first controller unit and the silent mode is not set by the second controller unit; and
a body transmitting unit operable to transmit the generated control signal to the interchangeable lens.

2. The camera body according to claim 1, wherein the third controller unit generates the control signal for changing the light amount which is changed by the driven diaphragm, at a constant speed and a maximum speed based on the speed information.

3. A camera system comprising an interchangeable lens and a camera body to which the interchangeable lens is mountable, wherein the interchangeable lens comprising:
an optical system operable to collect light from a subject to form a subject image;
a driving unit operable to drive a diaphragm for adjusting an amount of light of the subject image to be collected by the optical system; and
a lens transmitting unit operable to transmit, to the camera body, speed information relating to a settable speed of change in the light amount which is changed by the diaphragm driven by the driving unit;

the camera body comprising:
a receiving unit operable to receive the speed information;
a first controller unit operable to select a shooting mode from a moving image shooting mode for shooting a moving image and a still image shooting mode for shooting a still image;
a second controller unit capable of setting whether or not to operate in a silent mode which is provided for a situation where a drive sound of the drive unit is desired to be at a low level during the moving image shooting mode;
a third controller unit operable to generate a control signal for changing the light amount which is changed by the driven diaphragm, at a constant speed based on the speed information, when the moving image shooting mode is selected by the first controller unit and the silent mode is not set by the second controller unit; and
a body transmitting unit operable to transmit the generated control signal to the interchangeable lens.

4. The camera system according to claim 3, wherein the third controller unit generates the control signal for changing the light amount which is changed by the driven diaphragm, at a constant speed and a maximum speed based on the speed information.

5. A camera comprising:
an optical system operable to collect light from a subject to form a subject image;
a driving unit operable to drive a diaphragm for adjusting an amount of light of the subject image to be collected by the optical system;
a first controller unit operable to select a shooting mode from a moving image shooting mode for shooting a moving image and a still image shooting mode for shooting a still image;
a second controller unit capable of setting whether or not to operate in a silent mode which is provided for a situation where a drive sound of the drive unit is desired to be at a low level during the moving image shooting mode; and
a third controller unit operable to control to change the light amount which is changed by the driven diaphragm, at a constant speed based on a speed information relating to a settable speed of change in the light amount which is changed by the diaphragm driven by the driving unit, when the moving image shooting mode is selected by the first controller unit and the silent mode is not set by the second controller unit.

6. The camera according to claim 5, wherein the third controller unit controls to change the light amount which is changed by the driven diaphragm, at a constant speed and a maximum speed based on the speed information.

\* \* \* \* \*